(12) United States Patent
Okanoue et al.

(10) Patent No.: US 6,282,577 B1
(45) Date of Patent: Aug. 28, 2001

(54) MOBILE TERMINAL AND METHOD FOR CONTROLLING NETWORK CONNECTION THEREOF

(75) Inventors: Kazuhiro Okanoue; Tomoki Osawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/123,552

(22) Filed: Jul. 28, 1998

(30) Foreign Application Priority Data

Jul. 31, 1997 (JP) .................................................... 9-206439

(51) Int. Cl.$^7$ .......................... G06F 15/16; G06F 15/177; H04L 12/66

(52) U.S. Cl. .......................... 709/250; 709/222; 709/253; 370/463

(58) Field of Search ............................ 709/250, 220–222, 709/227–228, 253; 370/431, 463; 375/219; 713/1, 100; 340/825

(56) References Cited

U.S. PATENT DOCUMENTS

| | | | | |
|---|---|---|---|---|
| 5,513,210 | * | 4/1996 | Vook et al. | 375/202 |
| 5,572,528 | * | 11/1996 | Shuen | 370/85.13 |
| 5,623,495 | * | 4/1997 | Eng et al. | 370/397 |
| 5,729,680 | * | 3/1998 | Belanger et al. | 709/222 |
| 5,918,016 | * | 6/1999 | Brewer et al. | 709/220 |
| 5,956,331 | * | 9/1999 | Rautiola et al. | 370/338 |
| 5,987,024 | * | 11/1999 | Duch et al. | 370/350 |
| 6,134,587 | * | 10/2000 | Okanoue | 709/222 |

FOREIGN PATENT DOCUMENTS 0 680 177 A2 * 11/1995 (EP) .

OTHER PUBLICATIONS

Douglas E. Comer, "Internetworking With TCP/IP, vol. I: Principles, Protocols, and Architecture, Third Edition", 1995, Prentice–Hall, Chapter 21, pp. 365–405.

C. Perkins, Editor, "IP Mobility Support", Network Working Group, Request for Comments: 2002, Oct. 1996, pp. 1–80.

Johnson, D., "Routing in Ad Hoc Networks of Mobile Hosts," Proc. of the IEEE Workshop on Mobile Computing Systems and Applications, IEEE, pp. 1–6, Dec. 1994.*

Perkins, C., et al., "DHCP of Mobile Networking with TCP/IP," Proc. of the Symposium on Computers & Communications, IEEE, pp. 255–261, Jun. 1995.*

Johnson, D., et al., "Protocols for Adaptive Wireless and Mobile Networking," IEEE Personal Communications, vol. 3, No. 1, pp. 34–42, Feb. 1996.*

Leiner, B., et al., "Goals and Challenges of the DARPA GloMo Program," IEEE Personal Communications, pp. 34–43, Dec. 1996.*

Johnson, D., et al., Routing in Ad Hoc Networks of Mobile Hosts, http://www.monarch.cd.cmu.edu/monarch–papers/kluwer–adhoc.ps, pp. 1–18, Jan. 1996.*

* cited by examiner

Primary Examiner—Zarni Maung
Assistant Examiner—Andrew Caldwell
(74) Attorney, Agent, or Firm—Ostrolenk, Faber, Gerb & Soffen, LLP

(57) ABSTRACT

A mobile terminal detects a network formed on a communication media when the mobile terminal is to be connected to said communication media by transmitting control signals to and receiving control signals from the communication media and performs a connection control according to a protocol of a trunk network when the detected network is the trunk network or to a protocol of an ad hoc network when the detected network is the ad hoc network. When the mobile terminal can not detect a network to which the mobile terminal can be connected, the mobile terminal sets a new ad hoc network identifier for forming a new ad hoc network, after determining that the new ad hoc network identifier is not already in use another network.

4 Claims, 12 Drawing Sheets

MOBILE TERMINAL AND METHOD FOR CONTROLLING NETWORK CONNECTION THEREOF

BACKGROUND OF THE INVENTION

The present invention claims priority from Japanese Patent Application No.9-206439 filed Jul. 31, 1997, which is incorporated herein by reference.

1. Field of the Invention

The present invention relates to a control method of a network terminal connection for allowing a mobile terminal to communicate with either one of a trunk network to which the mobile terminal is connected through a junction node serving as a communication interface and an ad hoc network constructed with a plurality of mobile terminals connected thereto without using a junction node when the mobile terminal moves between the these networks, and a construction of the mobile terminal whose communication connection is controlled thereby.

2. Description of Related Art

There are two types of networks known among recent communication networks for mobile terminals. One of them is a network called a "trunk network" in which mobile terminals are mutually connected through junction nodes such as routers as in the Internet, and the other is a network called an "ad hoc network" in which there is no junction node provided and which is temporarily constructed with only mobile terminals.

When a mobile terminal establishes a communication connection in a network of either type, it is required to (1) grant an address of the mobile terminal used in the network to which the mobile terminal is connected or an address of the network and make the address known to all as common knowledge and (2) grant an address of a mobile terminal to be communicated therewith and make it known to all.

The grant of these addresses as common knowledge is performed in the trunk network, particularly, the Internet, by a server using the Dynamic Host Configuration Protocol (DHCP) for the requirement (1) and using the Domain Name System (DNS) for the requirement (2). DHCP and DNS are described in detail in, for example, Douglas E. Comer, "Internet working with TCP/IP, Volume I: Principles, Protocol and Architecture", Third edition, 1995, Prentice-Hall Inc.

In DHCP, mobile terminal addresses and trunk network addresses are stored in a DHCP server and, when a mobile terminal is to be connected to one of the networks, the mobile terminal requests the DHCP server for information necessary for connection thereof to the network, such as a mobile terminal address or a network address. In response to the request from the mobile terminal, the DHCP server assigns a mobile terminal address to the requesting mobile terminal such that the mobile terminal address does not conflict with those of other mobile terminals and provides the assigned mobile terminal address to the requesting mobile terminal.

FIG. 1 shows a DHCP sequence between the DHCP server and mobile terminals. In FIG. 1, mobile terminals #1 and #2 requesting connections to the network send DHCP requests by broadcast transmission. A DHCP server which receives the requests sends DHCP acknowledgement (DHCP ACK's) containing information of the address to be assigned to these mobile terminals #1 and #2, respectively. In the example shown in FIG. 1, the DHCP server sends DHCP ACK containing an address #1 to the mobile terminal #1 and DHCP ACK containing an address #2 to the mobile terminal #2.

FIG. 2 is a flowchart showing a sequence of procedures when a mobile terminal moves between trunk networks. When a mobile terminal enters from a trunk network into another network, the mobile terminal searches for the existence of communication media such an as Ethernet or wireless local area network (Wireless LAN), etc., to which the mobile station can be connected (Step S1). When there is no such communication media (S1: No), the mobile terminal can not be connected for communication and the procedure is ended (Step 2). On the contrary, when there is such communication media to which the mobile station can be connected (S1: Yes), the mobile terminal confirms the existence of the trunk network as the communication media (Step S3). When there is no trunk network (Step S3: No), the mobile terminal can not be connected for communication and the procedure is ended (Step S2). When there is a trunk network (Step S3: Yes), the mobile terminal performs a connection to the trunk network (Step S4).

The detection of the trunk network and the connection thereto can be realized by utilizing a technique called "Agent Discovery, Registration" disclosed in, for example, C. Perkins, "IP Mobility Support", Request for Comments, RFC2002, October 1996. In the disclosed technique, in order to support a mobile terminal moving between trunk networks, a node called a "Mobility Agent" is introduced in the trunk network.

In this case, in order to support the movement of the mobile terminal, a Home Address which is used regardless of the movement of the mobile terminal and a "Care of" Address which is used in a trunk network to which the mobile terminal is moved are assigned to the mobile terminal and a correspondence between these two addresses is managed by a Home Agent. The Home Agent temporarily receives a packet designated to the Home Address and transfers the packet to the mobile terminal at the destination thereof on the basis of a Care of Address corresponding to the Home Address.

In order to allow the mobile terminal to confirm the existence of the trunk network, a method called "Agent Discovery" is used. In this method, the Mobility Agent periodically transmits a message containing its own IP (Internet Protocol) address and an information (net mask) of length of a network portion in its IP address to broadcast. A value obtained by net-masking the IP address of the mobility agent coincides with an identifier of the trunk network. Such message is called a "trunk network identifier advertisement message". The mobile terminal determines whether or not there is a trunk network on the communication media, depending upon whether or not it can receive the trunk network identifier advertisement message within a predetermined time. The mobile terminal may also transmit a "trunk network identifier request message" requesting a transmission of the trunk network identifier advertisement message.

When the mobile terminal confirms the existence of the trunk network, the mobile terminal acquires a care-of address to be used in that trunk network by using DHCP and provides the care-of address to the home agent. Thus, the correspondence between the home address and the care-of addresses is registered in the home agent and the movement processing is completed.

On the other hand, in the case of an ad hoc network which is constructed with only mobile terminals, there is no server such as a DHCP server or mobility agent, etc. Therefore, it is impossible to connect a mobile terminal to the ad hoc network through the same procedure as that used in the trunk network.

SUMMARY OF THE INVENTION

The present invention is intended to solve such problems of the prior art as mentioned above and an object of the present invention is to provide a widely usable mobile terminal capable of automatically identifying one of a trunk network to which the mobile terminal is connected through a junction node and an ad hoc network constructed with only a plurality of mobile terminals and being connected to the selected one of the network when the mobile terminal moves between these networks and a network connection control method.

According to a first aspect of the present invention, a network connection control method for connecting a mobile terminal which is connectable to either one of a trunk network preliminarily provided with a network connection means for mobile terminals and an ad hoc network constructed with a plurality of mutually connected mobile terminals, is provided, which is featured by in that, when the mobile terminal is connected to a communication media, the mobile terminal detects a network constructed on the communication media by transmitting and receiving a control signal with respect to the communication media, performs a connection control according to a protocol of the detected network and, when there is no network to which the mobile terminal can be connected on the communication media, the mobile terminal sets a new ad hoc network identifier for constructing a new ad hoc network.

According to a second aspect of the present invention, a mobile terminal which is connectable to either one of a trunk network preliminarily provided with a network connection means for mobile terminals and an ad hoc network constructed with a plurality of mutually connected mobile terminals, is provided, which is featured by comprising network detection means for detecting whether or not a network to which the mobile terminal can be connected on a communication media when the mobile terminal is connected to the communication media, trunk network connection means for performing a connection control to a trunk network when the network detection means detects an existence of the trunk network, ad hoc network connection means for performing a connection control to an ad hoc network when the network detection means detects an existence of the ad hoc network and ad hoc network identifier setting means for setting a new ad hoc network identifier for constructing a new ad hoc network when the network detection means detects an absence of a network to which the network detection means is connectable.

The network detection means comprises mobile terminal identifier candidate setting means for setting a candidate of a mobile terminal identifier predicted as being able to be used in a network assigned by an ad hoc network identifier, mobile terminal identifier setting request message forming means for forming a mobile terminal identifier setting request message into which information related to a mobile terminal identifier is set as a candidate, broadcast message transmission means for transmitting the formed mobile terminal identifier setting request message to be broadcast, means for setting the candidate of the mobile terminal identifier as its own identifier when an in-use mobile terminal identifier message indicating that the candidate of the mobile terminal identifier provided by the mobile terminal identifier setting request message is already used is not received within a predetermined time from the transmission of the mobile terminal identifier setting request message, and means for activating the mobile terminal identifier candidate setting means to allow the latter to select another candidate when the in-use mobile terminal identifier message indicating that the candidate of the mobile terminal identifier provided by the mobile terminal identifier setting request message is already used is received within the predetermined time from the transmission of the mobile terminal identifier setting request message. Further, in order to accommodate one mobile terminal connected an ad hoc network to a situation in which another mobile terminal is newly connected to the ad hoc network, each mobile terminal may comprise means for comparing a mobile terminal identifier provided by a mobile terminal identifier setting request message received from another mobile terminal with its own terminal identifier and returning the in-use mobile terminal identifier message when the mobile terminal identifiers are identical.

The ad hoc network identifier setting means may comprise ad hoc network identifier candidate setting means for setting an ad hoc network identifier candidate for identifying a new ad hoc network to be newly formed, ad hoc network identifier setting request message forming means for forming an ad hoc network identifier setting request message containing information related to an ad hoc network identifier set as a candidate, broadcast message transmission means for transmitting the thus formed ad hoc network identifier setting request message to be broadcast to the communication media, means for setting the candidate of the mobile terminal identifier as its own identifier when an in-use mobile terminal identifier message indicating that the candidate of the mobile terminal identifier provided by the mobile terminal identifier setting request message is already used is not received within a predetermined time from the transmission of the mobile terminal identifier setting request message, and means for activating the mobile terminal identifier candidate setting means to allow the latter to select another candidate when an in-use mobile terminal identifier message indicating that the candidate of the mobile terminal identifier provided by the mobile terminal identifier setting request message is already used is received within the predetermined time from the transmission of the mobile terminal identifier setting request message. Further, in order to accommodate one mobile terminal connected an ad hoc network in a case where another mobile terminal is newly connected to the ad hoc network, each mobile terminal may comprise means for comparing a mobile terminal identifier provided by a mobile terminal identifier setting request message received from another mobile terminal with its own terminal identifier and returning the in-use mobile terminal identifier message when the mobile terminal identifiers are identical.

In the present invention, the mobile terminal automatically distinguishes a trunk network or an ad hoc network to which the mobile terminal is to be connected and performs a setting necessary to connect it to the distinguished network through one of different control procedures. By using control procedures for mainly broadcasting in the ad hoc network, there is no need to use a server as in the trunk network and there is no conflict between the ad hoc network control procedures and the trunk network control procedures. That is, respective mobile terminals connected to the ad hoc network execute the control procedures by the same processing, that is, in the same ground. As a result, when the mobile terminal moves between the trunk network and the ad hoc network, the mobile terminal can automatically identify the respective networks and connect thereto, so that communication in the respective networks becomes possible, causing the mobile terminal to be used widely.

BRIEF DESCRIPTION OF THE DRAWINGS

Preferred embodiments of the present will be described in detail with reference to the accompanying drawings, wherein.

DETAILED DESCRIPTION OF THE PREFERRED EMBODIMENTS

Figure 1:
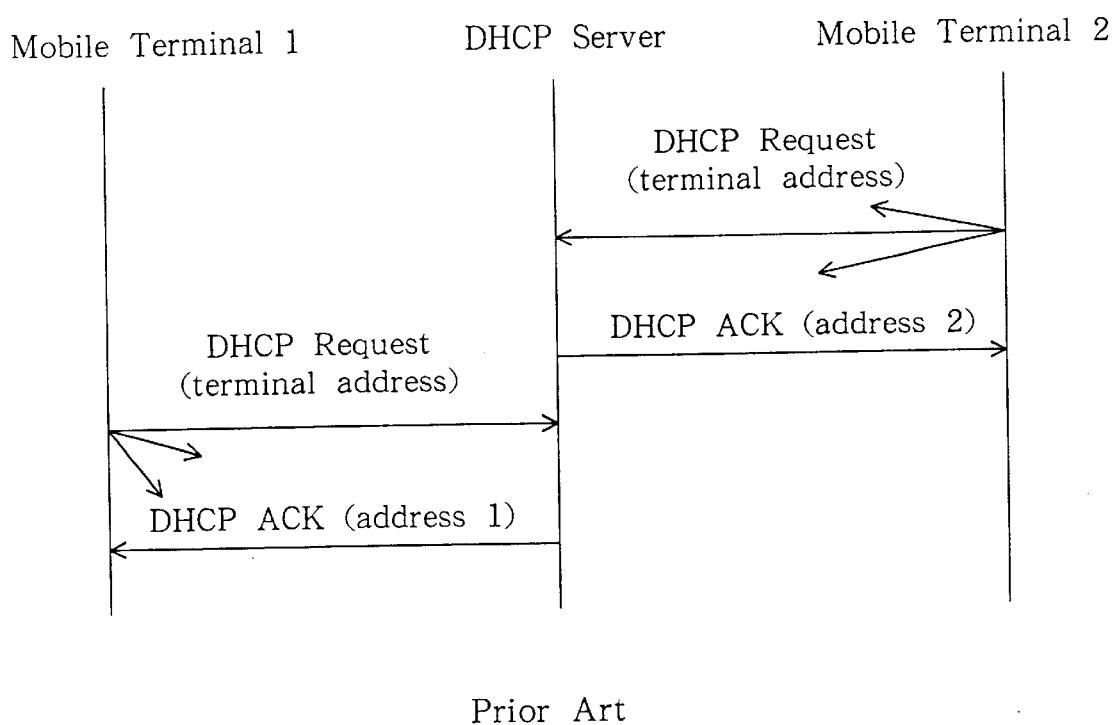
FIG. 1 shows a DHCP sequence between a DHCP server and mobile terminals.
Figure 2:
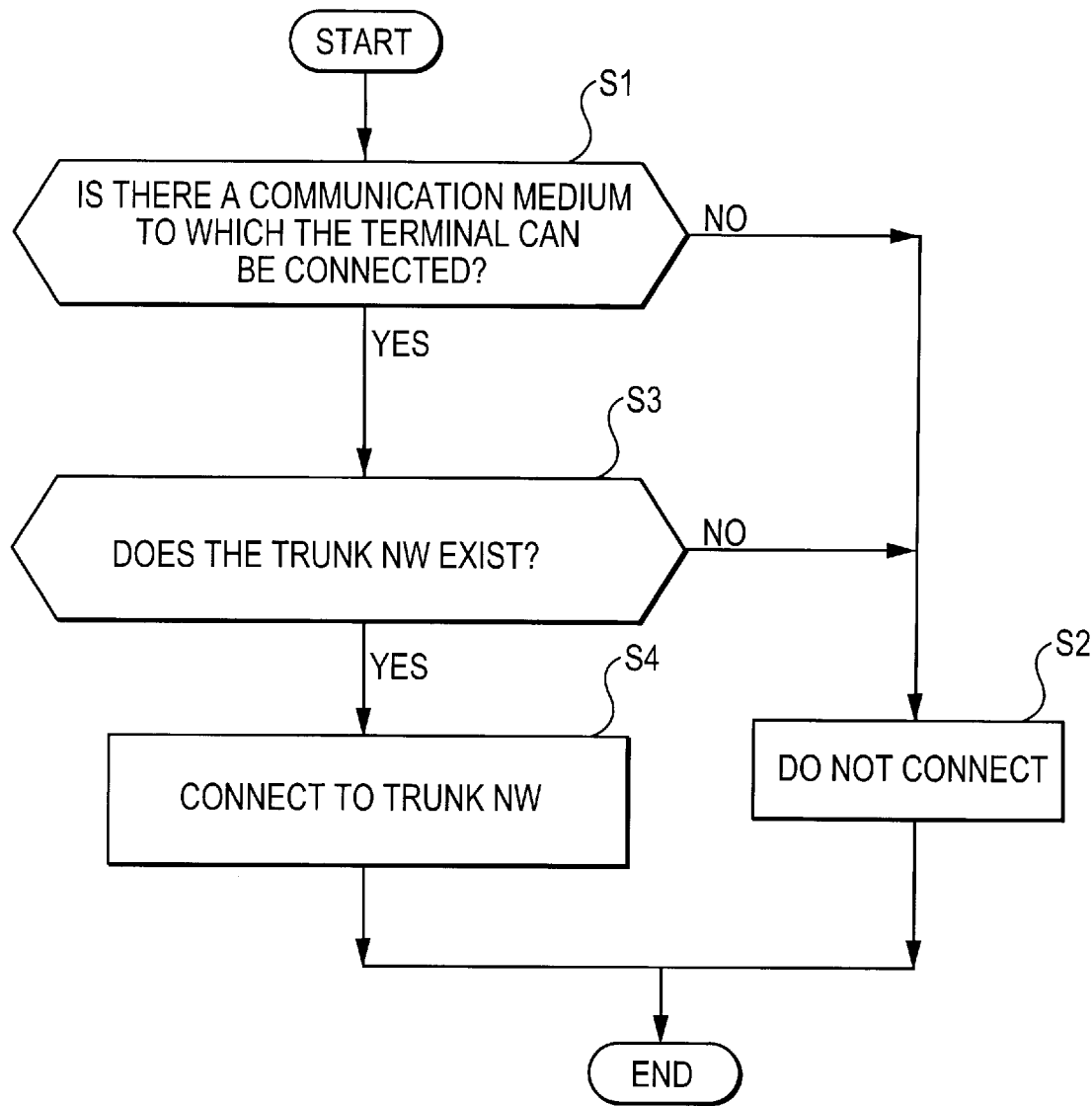
FIG. 2 is a flowchart showing processing procedures when a mobile terminal moves between trunk networks.
Figure 3:
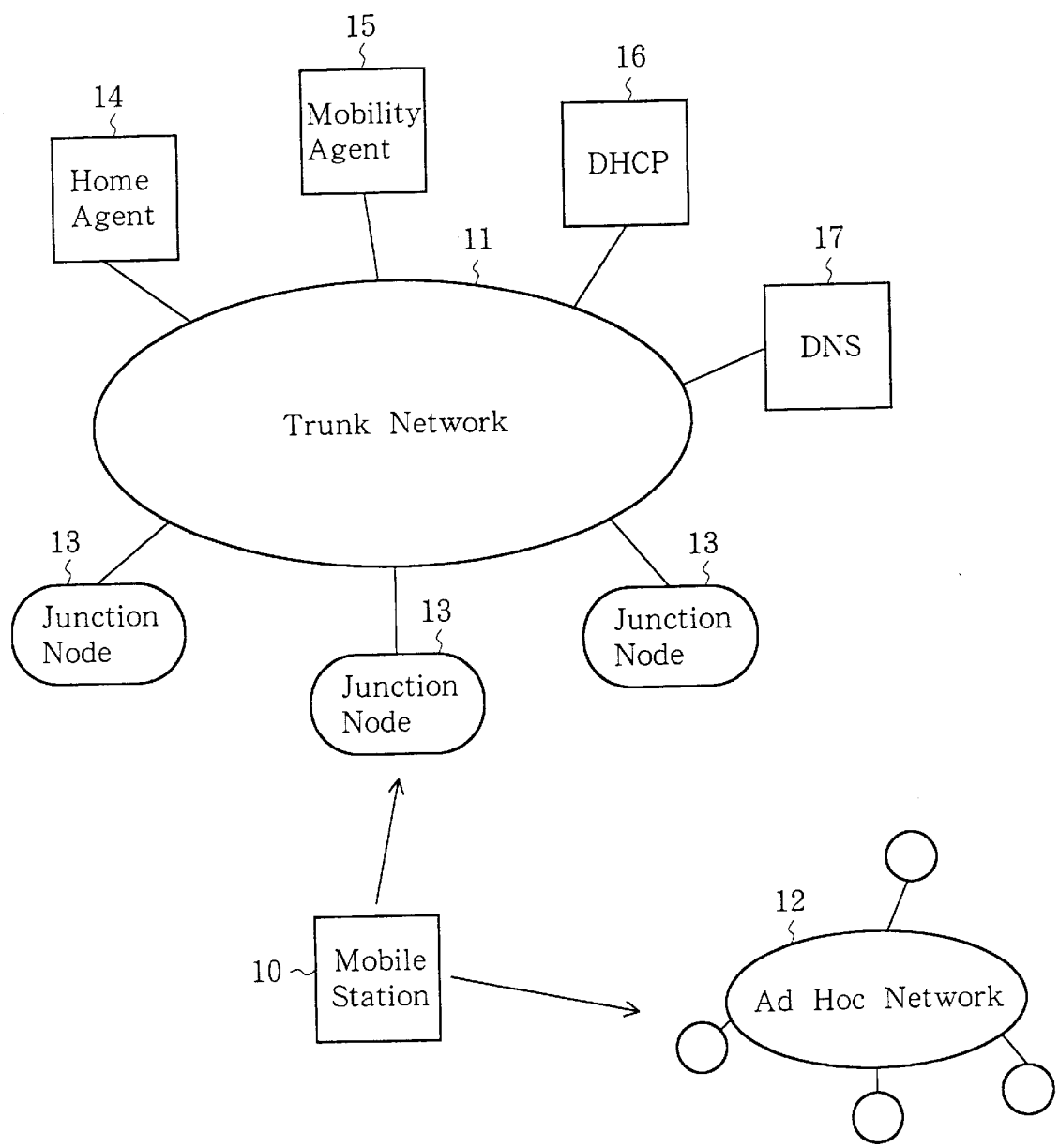
FIG. 3 shows a construction of a network for practicing the embodiment of the present invention.

FIG. 3 shows a network construction in a preferred embodiment of the present invention. Each of mobile terminals 10 can be connected to either a trunk network (trunk NW) 11 or ad hoc networks (ad hoc NW's) 12 (only one ad hoc NW is shown in FIG. 3 for simplicity of illustration). Junction nodes 13 for connecting the mobile terminals 10 to the trunk NW 11, a home agent server 14, a mobility agent server 15, a DHCP server 16 and a DNS server 17 are provided in the trunk NW 11. The ad hoc NW 12 has no such junction nodes or servers as those in the trunk NW 11 and is constructed by connecting the mobile terminals mutually.

Figure 4:
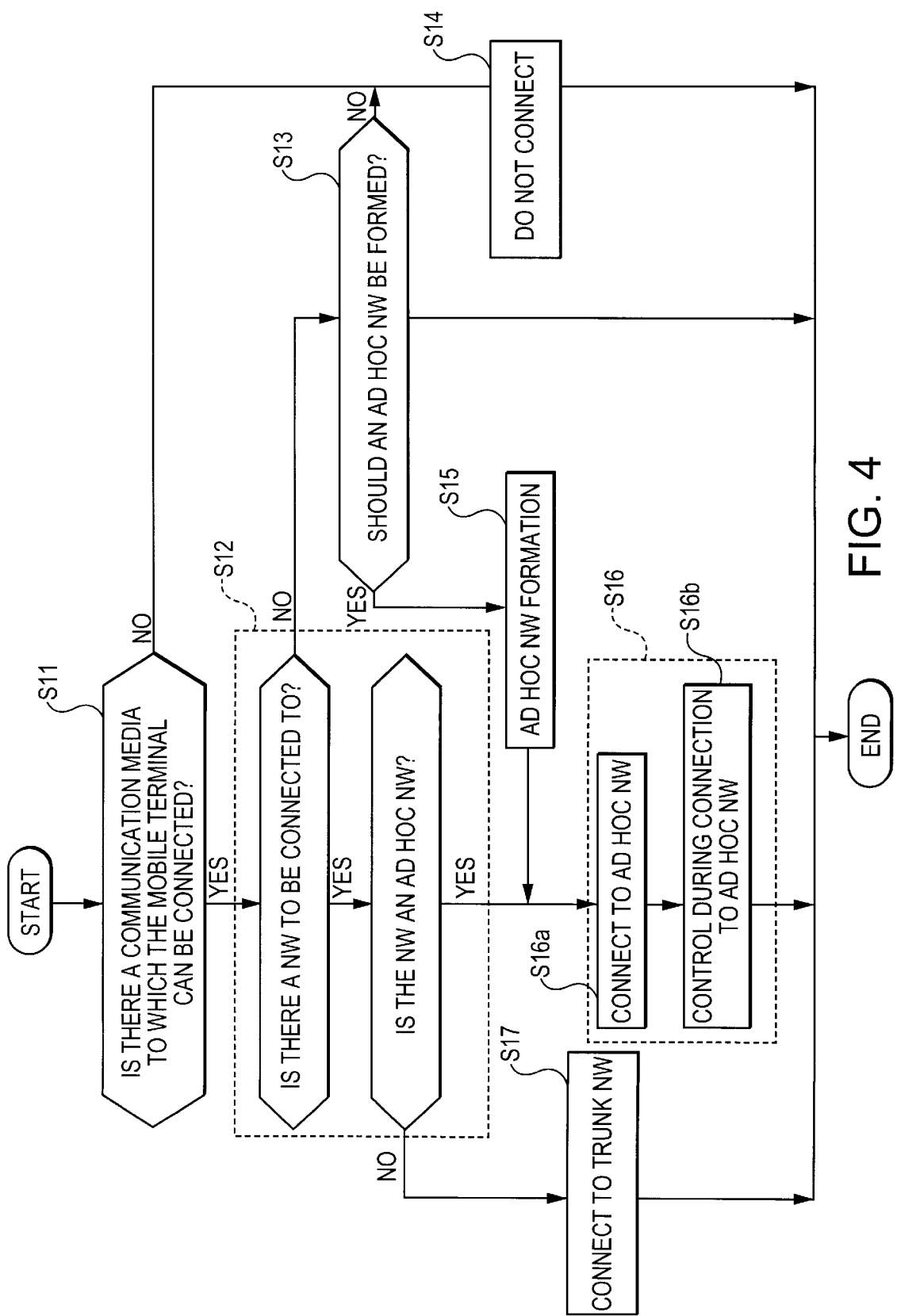
FIG. 4 is a flowchart showing a connecting procedure performed by the mobile terminal.

FIG. 4 shows a flowchart of the connection procedures performed by the mobile terminal.

When a mobile terminal is to be connected to one of the NW's 11 and 12, the mobile terminal determines whether or not there is a communication media through which it can be connected to the network (Step S11). In a case where a mobile terminal equipped with a connector for connection to an Ethernet is to be connected to a network, this determination is performed by detecting the existence of an Ethernet. When there is no communication media through which the mobile terminal can be connected to the network, the mobile terminal can not perform the connection thereto.

When there is a communication media through which the mobile terminal can be connected to a network, the mobile terminal performs a network detection procedure for detecting the network on the communication media (Step S12). First, in this network detection process, the mobile terminal judges whether or not there is a network to which the mobile terminal can be connected. When it is clear that a network exists, then the mobile terminal judges whether the existing network to which the mobile terminal is to be connected is an ad hoc network or a trunk network.

When there is no network to which the mobile terminal is to be connected, the mobile terminal judges whether or not a new ad hoc network is to be formed (Step S13). When a new ad hoc network should not be formed, the mobile terminal does not perform a connection to any network (Step S14). When the mobile terminal should form a new ad hoc network, the mobile terminal performs the ad hoc network identifier setting procedure (ad hoc NW ID setting procedure) to form the ad hoc network (Step S15).

Further, the mobile terminal performs the ad hoc network connection procedure to connect it to the ad hoc network (Step S16). In this ad hoc network connection procedure, a control process (Step S16a) which is necessary when the mobile terminal is about to be connected to the ad hoc network and a control process (Step S16b) which is necessary when the mobile terminal is being connected to the ad hoc network are executed by the mobile terminal.

In a case where, in this network connection procedure, there is a network to which the mobile terminal is to be connected and the network is a trunk network, the trunk network connection procedure is performed (Step S17). On the other hand, when there is a network to which the mobile terminal is to be connected and the network is an ad hoc network, the ad hoc network connection procedure is performed. In this manner, the network to which the mobile terminal is to be connected is selected and the connection is made thereto. The trunk network connection procedure (Step S17) can be performed through procedures similar to those disclosed in the previously mentioned article "IP Mobility Support".

In the network detection processing step S12 for connection to the trunk network, the node of the mobility agent connected thereto periodically performs a broadcast transmission of a message containing its own IP address and information (net mask) of a length of a network portion at the IP address, that is, the trunk NW ID advertisement message. The identifier of the trunk network is obtained by net-masking the IP address of the mobility agent. The mobile terminal judges whether or not there is a trunk network on the communication media by determining whether or not the trunk NW ID advertisement message can be received within a predetermined time.

For the ad hoc network, the mobile terminal connected thereto transmits the ad hoc NW ID advertisement message containing the identifier of the ad hoc network. The mobile terminal decides that there is an ad hoc network formed on the communication media when it receives this message within the predetermined time. When the mobile terminal does not receive any message within the predetermined time, it decides that there is no ad hoc network formed on the communication media.

Figure 5:
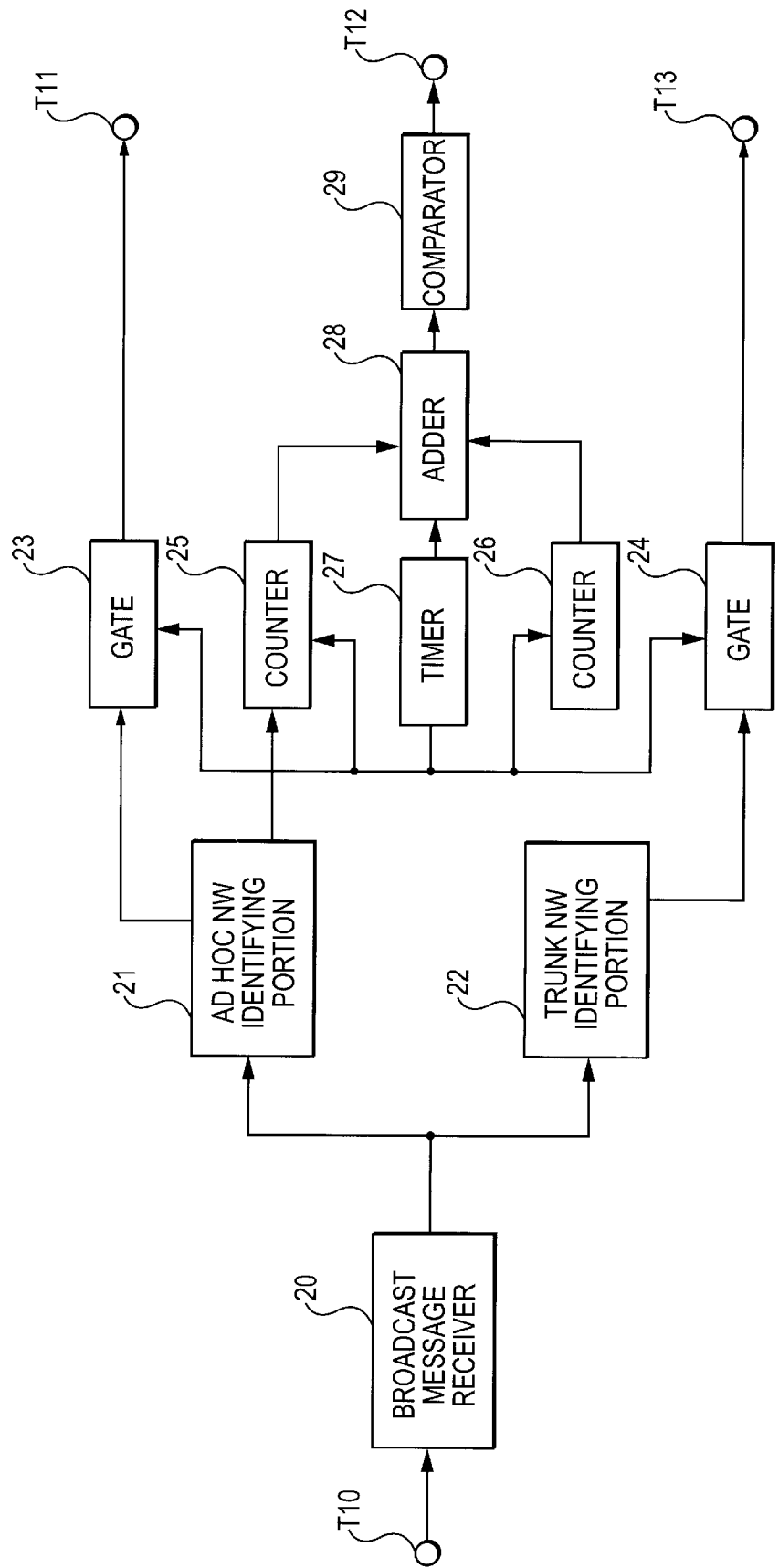
FIG. 5 is a block diagram of a mobile terminal.

FIG. 5 is a block diagram showing a construction of the mobile terminal. In FIG. 5, the mobile terminal comprises an input terminal T10, output terminals T11, T12 and T13, a broadcast message receiver portion 20 having an input connected to the input terminal T10, an ad hoc network identifying portion 21 having an input connected to an output of the broadcast message receiver portion 20, a trunk network identifying portion 22 having an input connected to the output of the broadcast message receiving portion, a timer 27, gates 23 and 24, counters 25 and 26, an adder 29 and a comparator 29.

A message transmitted through the communication media is input through the input terminal T10 to the broadcast message receiving portion 20. The broadcast message receiving portion 20 derives a broadcast message from the input message. The broadcast message thus derived is input to the ad hoc network identifying portion 21 and the trunk network identifying portion 22. The ad hoc network identifying portion 21 decides whether or not the input message is an ad hoc NW ID advertisement message. When it is an ad hoc NW ID advertisement message, the ad hoc network identifying portion 21 outputs an ad hoc network identifier contained in the message to the gate 23 and outputs a detection pulse to the counter 25. The trunk network identifying portion 22 determines whether or not the input message is a trunk NW ID advertisement message. When it is a trunk NW ID advertisement message, the trunk network identifying portion 22 outputs a trunk network identifier contained in the message to the gate 24 and outputs a detection pulse to the counter 26.

The gates 23 and 24 and the counters 25 and 26 are operated according to an output of the timer 27 which times for the predetermined time from a time at which the mobile terminal starts the network detection operation through the communication media. The gates 23 and 24 allow signals input thereto to pass through during the predetermined time for which the timer 27 operates and block the input signals after the timer 27 times the predetermined measures, respectively. The counters 25 and 26 count up input pulses during the predetermined time for which the timer 27 operates and output the accumulated the values at a time the timer 27 stops, respectively. Thus, when the ad hoc network identifier is received by the ad hoc network identifying portion 21 through the broadcast message receiving portion 20 during the predetermined time for which the timer 27 operates, the ad hoc network identifier is output to the output terminal T11 through the gate 23 and, when the trunk network identifier is received by the trunk network identifying portion 22 through the broadcast message receiving portion 20 during the predetermined time for which the timer 27 operates, the trunk network identifier is output to the output terminal T13 through the gate 24. The counter 25 further outputs the number of the ad hoc NW ID advertisement messages received during the predetermined time for which the timer 27 operates and the counter 26 outputs the number of the trunk NW ID advertisement messages received during the predetermined time for which the timer 27 operates.

The outputs of the counters 25 and 26 are summed by the adder 28 and a resultant sum is supplied to the comparator 29. The comparator 29 compares the output of the adder 28 with zero and, when the input from the adder 28 is zero, outputs a signal indicating that neither an ad hoc network nor a trunk network exists on the communication media to the output terminal T12. The mobile terminal selects a network to be connected to or determines whether or not an ad hoc network is to be formed, by using the ad hoc NW ID output to the output terminal T11, the trunk network identifier output to the output terminal T13 or the information that neither an ad hoc network nor a trunk network exists, which is obtained by an absence of both an ad hoc NW ID and a trunk network identifier.

Further, in order to immediately know a network to which the mobile terminal can be connected currently, the mobile terminal may transmit the ad hoc NW ID advertisement request message for requesting an ad hoc NW ID advertisement message or the trunk NW ID advertisement request message for requesting a trunk NW ID advertisement message. For example, in a case where wireless communication is considered, when a mobile terminal communicating with another using a certain frequency moves to an area which can not be covered by the certain frequency wave, the mobile terminal becomes unable to receive the advertisement message which is currently being received thereby. In such case, the mobile terminal may wait for a periodic advertisement message by using another frequency. However, since such a countermeasure is time consuming, the mobile terminal itself transmits an advertisement request message. In order to quickly respond to this advertisement request message, the ad hoc network or the trunk network to which the message is transmitted transmits the ad hoc NW ID advertisement message or the trunk NW ID advertisement message through a mobile terminal within the ad hoc network or the trunk network.

Figure 6:
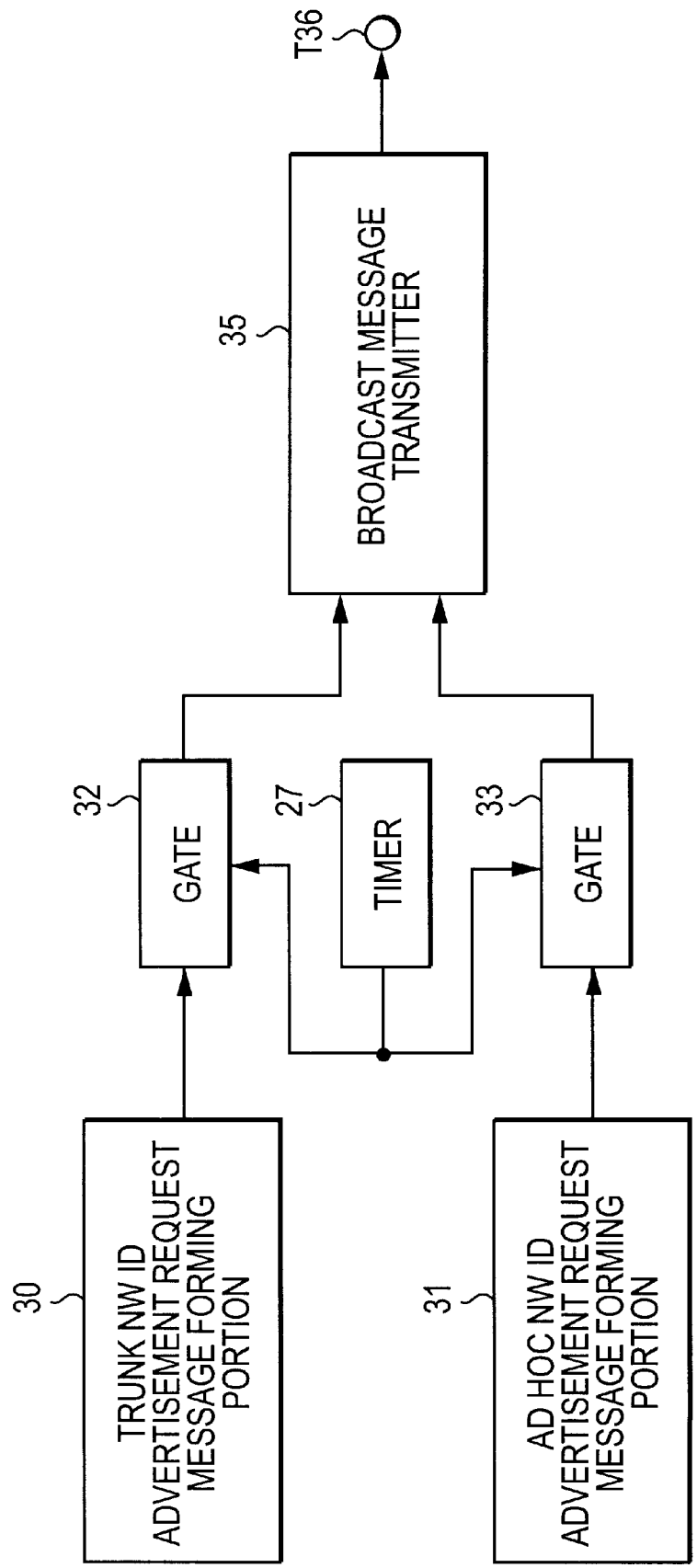
FIG. 6 is a block diagram of a construction for transmitting an ad hoc network identifier advertisement request message and a trunk network identifier advertisement request message.

FIG. 6 is a block diagram of a circuit construction for transmitting the ad hoc NW ID advertisement request message and the trunk NW ID advertisement message. As shown in FIG. 6, the mobile terminal includes, in addition to the structure shown in FIG. 5, a trunk NW ID advertisement request message forming portion 30, an ad hoc NW ID advertisement request message forming portion 31, gates 32 and 33, a broadcast message transmitter portion 35 and an output terminal T36. In a case where the mobile terminal transmits the ad hoc NW ID advertisement request message and the trunk NW ID advertisement request message, the trunk NW ID advertisement request message forming portion 30 and the ad hoc NW ID advertisement request message forming portion 31 are activated. The gates 32 and 33 allow signals input thereto to pass through during the predetermined time for which the timer 27 (FIG. 5) operates and block the input signals after the operation of the timer 27 is stopped, respectively. The broadcast message transmitter portion 35 transmits the ad hoc NW ID advertisement request message and the trunk NW ID advertisement request message from the respective gates 32 and 33 through the output terminal T36 to the communication media (ad hoc network or trunk network) for the predetermined time set by the timer 27.

Figure 7:
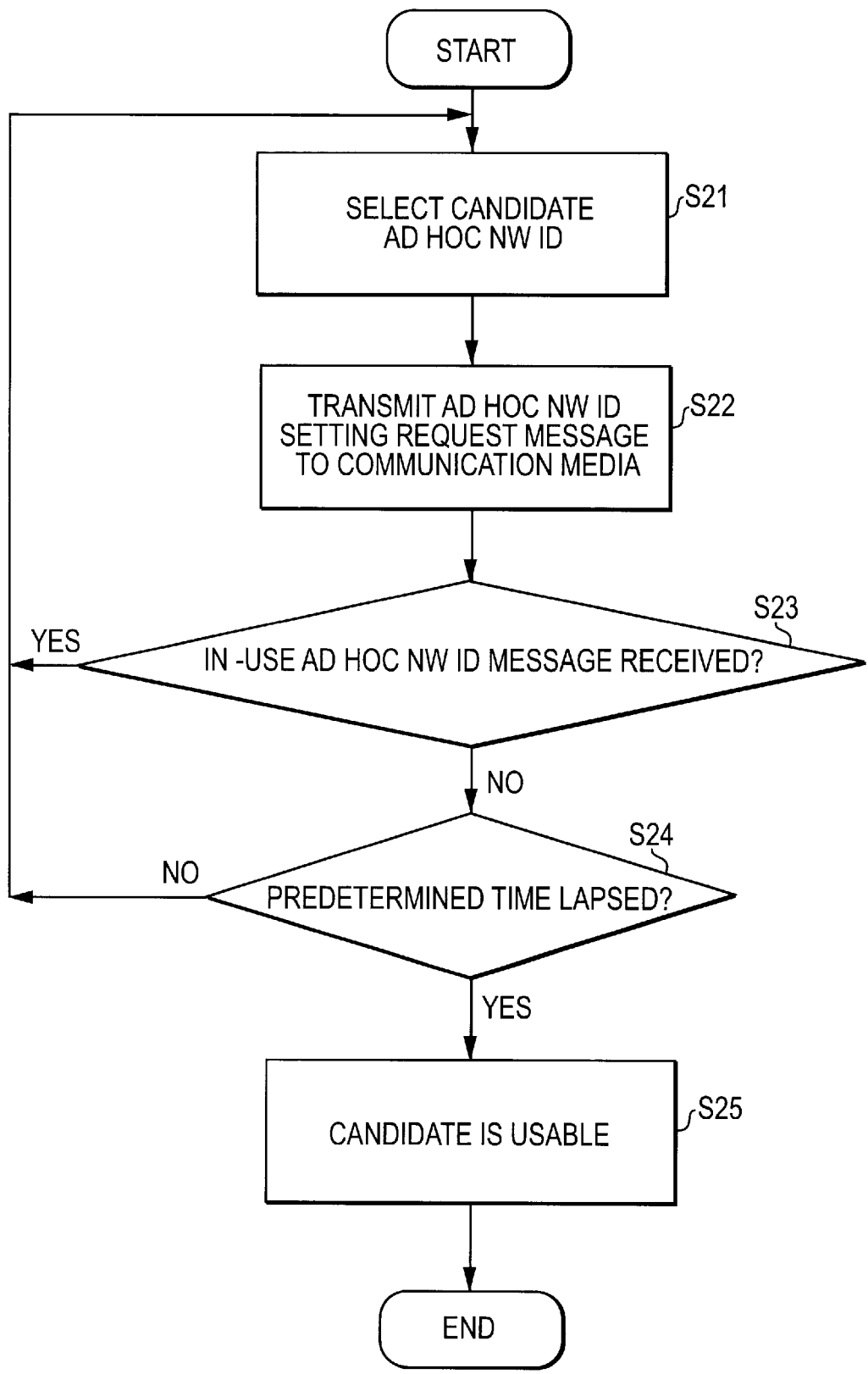
FIG. 7 is a detailed flowchart of an ad hoc network identifier setting process.

FIG. 7 is a detailed flowchart of the ad hoc NW ID setting process (Step S15 in FIG. 4). In this process, a mobile terminal which is going to form a new ad hoc network sets a new ad hoc network identifier.

The mobile terminal which is going to form the new ad hoc network determines a candidate ad hoc network identifier for use in the new ad hoc network (Step S21) and transmits the ad hoc NW ID setting request message containing the candidate ad hoc network identifier to the communication media (Step S22).

A plurality of ad hoc networks can be formed on one communication medium and, when another ad hoc network is already formed, the ad hoc NW ID setting request message for forming a new ad hoc network is received by a mobile terminal on the existing ad hoc network. When the candidate ad hoc network identifier, which is contained in the ad hoc NW ID setting request message, is identical to the identifier of the existing ad hoc network to which the mobile terminal is connected, the mobile terminal transmits an in-use ad hoc NW ID message containing the ad hoc network identifier and indicating that the candidate is already used in the communication medium.

When the mobile terminal which is going to form a new ad hoc network receives the in-use ad hoc network identifier message for the candidate ad hoc network identifier within the predetermined time (Step S23), the mobile terminal determines that the candidate ad hoc network identifier is unusable. On the basis of this determination, the mobile terminal transmits an ad hoc NW ID setting request message using a different candidate of the ad hoc network identifier to the communication media (Step S22). When the mobile terminal does not receive the in-use ad hoc network identifier message for the different candidate ad hoc network identifier within the predetermined time (Steps S23, S24), the mobile terminal determines that the different candidate ad hoc network identifier as being usable as an ad hoc network identifier of the ad hoc network to be newly formed (Step S25).

Figure 8:
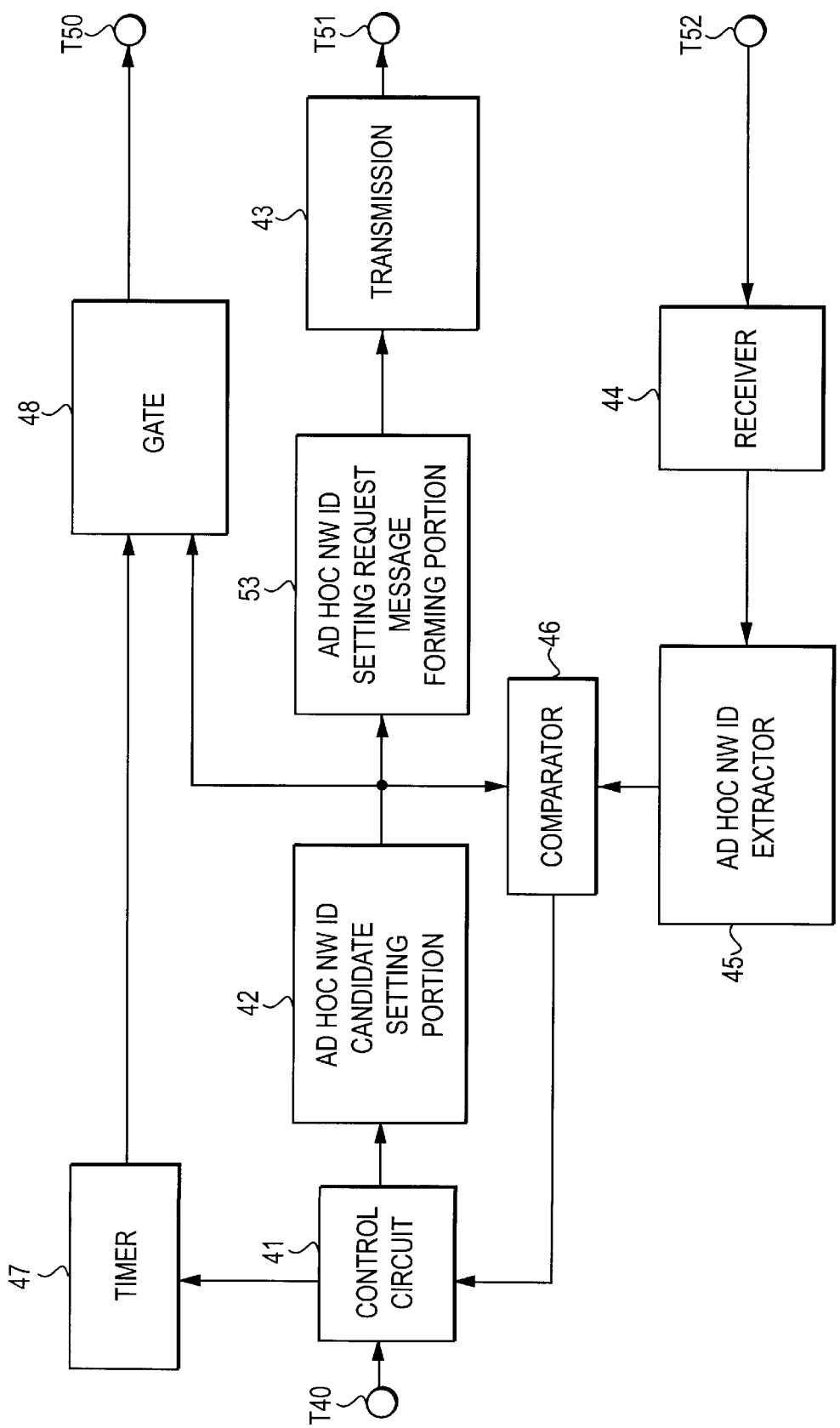
FIG. 8 is a block diagram of a construction for forming a new ad hoc network.

FIG. 8 is a block diagram of a circuit construction for forming the new ad hoc network. As shown in FIG. 8, the mobile terminal includes, in addition to the construction described with reference to FIG. 5, input terminals T40 and T52, a control circuit 41, an ad hoc NW ID candidate setting portion 42, a transmitter portion 43, a receiver portion 44, an ad hoc NW ID extractor portion 45, a comparator 46, a timer 47, a gate and output terminals T50 and T51.

A signal input from the input terminal T40 and indicative of a formation of an ad hoc network or an ad hoc NW ID re-setting request from the comparator 46 is input to the control circuit 41. The control circuit 41 activates the timer 47 and the ad hoc NW ID candidate setting portion 42. The ad hoc NW ID candidate setting portion 42 sets a candidate of the ad hoc network identifier and outputs the candidate to the ad hoc NW ID setting request message forming portion 53, the comparator 46 and the gate 48.

The ad hoc NW ID setting request message forming portion 53 forms the ad hoc NW ID setting request message containing the input candidate of the ad hoc network identifier and transmits it through the transmitter portion 43 and the output terminal T51 to the communication media. On the other hand, the mobile terminal receives at the receiver portion 44 thereof the message on the communication media through the input terminal T52 and outputs it to the ad hoc NW ID extractor portion 45. The ad hoc NW ID extractor portion 45 selects the in-use ad hoc network identifier message from the input message, extracts the in-use ad hoc network identifier therefrom and inputs it to the comparator 46.

In the comparator 46, the ad hoc network identifier obtained from the ad hoc NW ID extractor portion 45 is compared with the candidate ad hoc network identifier obtained from the ad hoc NW ID candidate setting portion 42 and, when both are identical, the mobile terminal transmits an ad hoc NW ID re-setting request signal to the control circuit 41 to request setting a different candidate ad hoc network identifier.

In the above mentioned operation of the mobile terminal, when the timer 47 times out, it is determined that the ad hoc network identifier set by the ad hoc NW ID candidate setting portion 42 is not being used in other ad hoc networks. Therefore, the gate 48 is opened when the timer 47 times the predetermined time to output the candidate ad hoc network identifier, which is output by the ad hoc NW ID candidate setting portion 42, to the output terminal T50 as the identifier of an ad hoc network to be newly formed.

Figure 9:
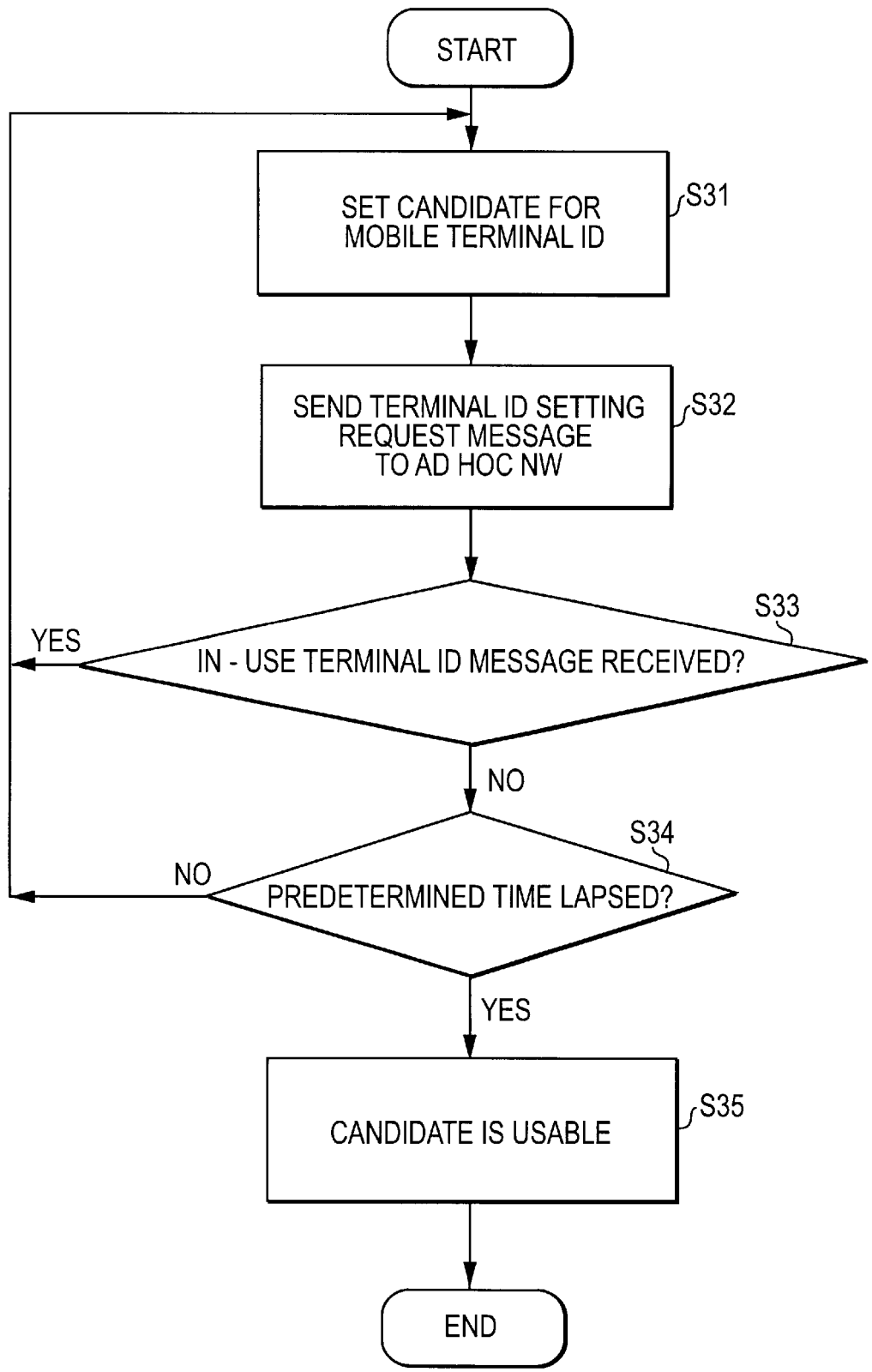
FIG. 9 is a detailed flowchart of a control process at a time of an ad hoc network connection.

FIG. 9 is a detailed flowchart of the control process at a time when the connection of the mobile terminal is made to the ad hoc network (Step S16a in FIG. 4). In this process, in order to connect the mobile terminal to the ad hoc network which already exists on the communication media, the mobile terminal acquires a mobile terminal identifier to be used in that ad hoc network. The mobile terminal selects a candidate among terminal identifiers suitable for that ad hoc network identifier (Step S31). The mobile terminal transmits the mobile terminal identifier setting request message containing this terminal identifier candidate to an ad hoc network to which the mobile terminal is to be connected (Step S32). In response to the mobile terminal identifier setting request message, a mobile terminal which is already connected to the ad hoc network determines whether or not the candidate of the mobile terminal identifier contained in the message is identical to its own identifier. If these identifiers are identical, the mobile terminal performs broadcast transmission of the in-use station identifier message including its own terminal identifier to the ad hoc network. When the mobile terminal which is going to connect to the ad hoc network does not receive the in-use terminal identifier message for the candidate mobile terminal identifier within a predetermined time (Steps S33 and S34), the mobile terminal uses the candidate mobile terminal identifier as its own terminal identifier (Step S35). On the other hand, when the mobile terminal which is going to be connected to the ad hoc network does receive the in-use terminal identifier message for the candidate mobile terminal identifier within the predetermined time, the mobile terminal selects another candidate mobile terminal identifier (Step S31) and transmits the terminal identifier setting request message to the ad hoc network (Step S32).

Figure 10:
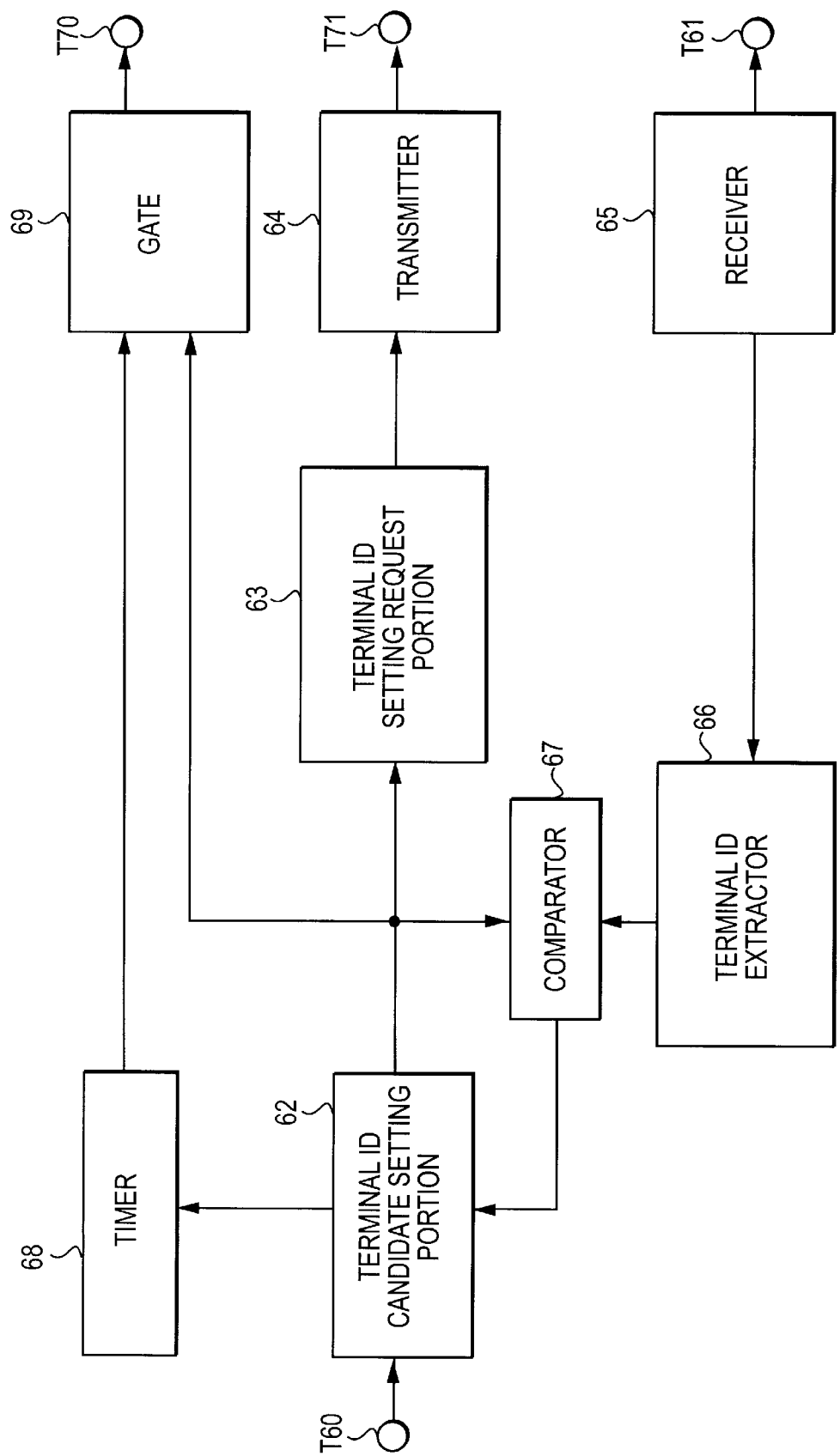
FIG. 10 is a block diagram of a construction for connecting a mobile terminal to an existing ad hoc network.

FIG. 10 is a block diagram of a circuit construction for making a connection of a mobile terminal to an existing ad hoc network. As shown in FIG. 10, the mobile terminal includes, in addition to the above mentioned construction, input terminals T60 and T61, a mobile terminal identifier candidate setting portion 62, a mobile terminal identifier setting request portion 63, a transmitter portion 64, a receiver 65, a mobile terminal identifier extractor portion 66, a comparator 67, a timer 68 for timing a predetermined time, a gate 69 and output terminals T70 and T71.

In response to an ad hoc network identifier of an ad hoc network to which the mobile terminal is to be connected or a mobile terminal identifier re-setting request signal from the comparator 67, which is supplied to the input terminal, the mobile terminal identifier candidate setting portion 62 sets a candidate mobile terminal identifier, supplies the candidate to the gate 69 and the mobile terminal identifier setting request portion 63 and activates the timer 68. The mobile terminal identifier setting request portion 63 produces a mobile terminal identifier setting request message including the inputted candidate mobile terminal identifier and performs a broadcast transmission of the mobile terminal identifier setting request message to the communication media through the transmitter portion 64 and the output terminal T71.

On the other hand, the message transmitted through the input terminal T61 to the ad hoc network is input to the mobile terminal identifier extractor portion 66. The mobile terminal identifier extractor portion 66 selects the in-use station identifier message from the input message, extracts an in-use terminal identifier therefrom and outputs the in-use terminal identifier to the comparator 67.

The comparator 67 compares the mobile terminal identifier from the terminal identifier extractor portion 66 with the mobile terminal identifier from the mobile terminal identifier candidate setting portion 62 and, when these identifiers are identical, transmits the mobile terminal identifier re-setting request signal to the mobile terminal identifier setting portion 62 to request a setting of another candidate identifier.

In the operation mentioned above, when the predetermined time the timer 68 lapses, it can be determined that; the mobile terminal identifier set by the mobile terminal identifier candidate setting portion 62 is not being used by any other terminal. Therefore, the gate 69 is opened when the predetermined time in the timer 68 lapses to transmit the candidate terminal identifier output by the mobile terminal identifier candidate setting portion 62 from the output terminal T70 as the mobile terminal identifier in the ad hoc network to which the mobile terminal is to be newly connected.

Figure 11:
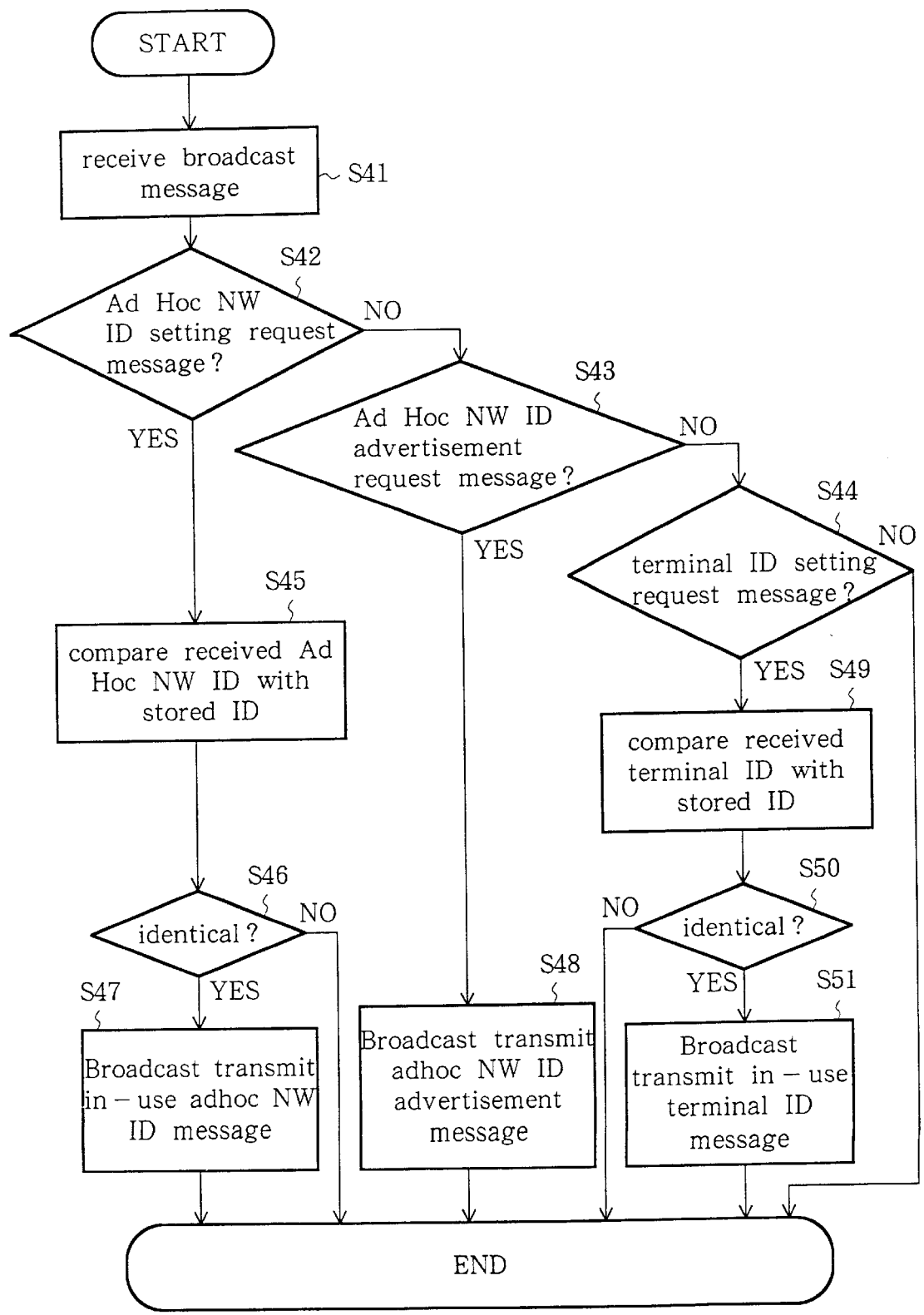
FIG. 11 is a detailed flowchart of a control process at an ad hoc network connection.

FIG. 11 is a detailed flowchart of the control process at the connection of another mobile terminal to the ad hoc network (Step S16b in FIG. 4). In this process, when the mobile terminal receives the broadcast message from the ad hoc network (Step S41), the mobile terminal decides whether the broadcast message is the ad hoc NW ID setting request message (Step S42), the ad hoc NW ID advertisement request message (Step S43) or the mobile terminal identifier setting request message (Step S44). When the received broadcast message is the ad hoc NW ID setting request message, the mobile terminal compares the candidate ad hoc network identifier contained in the message with the identifier of the ad hoc network to which the mobile station is connected (Step S45) and, when they are identical (Step S46), the mobile terminal performs a broadcast transmission of the in-use ad hoc network identifier message containing the ad hoc network identifier to the communication media (Step S47). When the received broadcast message is the ad hoc NW ID advertisement request message, the mobile terminal performs a broadcast transmission of the ad hoc NW ID advertisement message (Step S48). When the received broadcast message is the mobile terminal identifier setting request message, the mobile terminal compares the candidate terminal identifier contained in that message with its own identifier (Step S49) and, when they are identical (Step S50), the mobile terminal performs a broadcast transmission of the in-use terminal identifier message to the ad hoc network.

Figure 12:
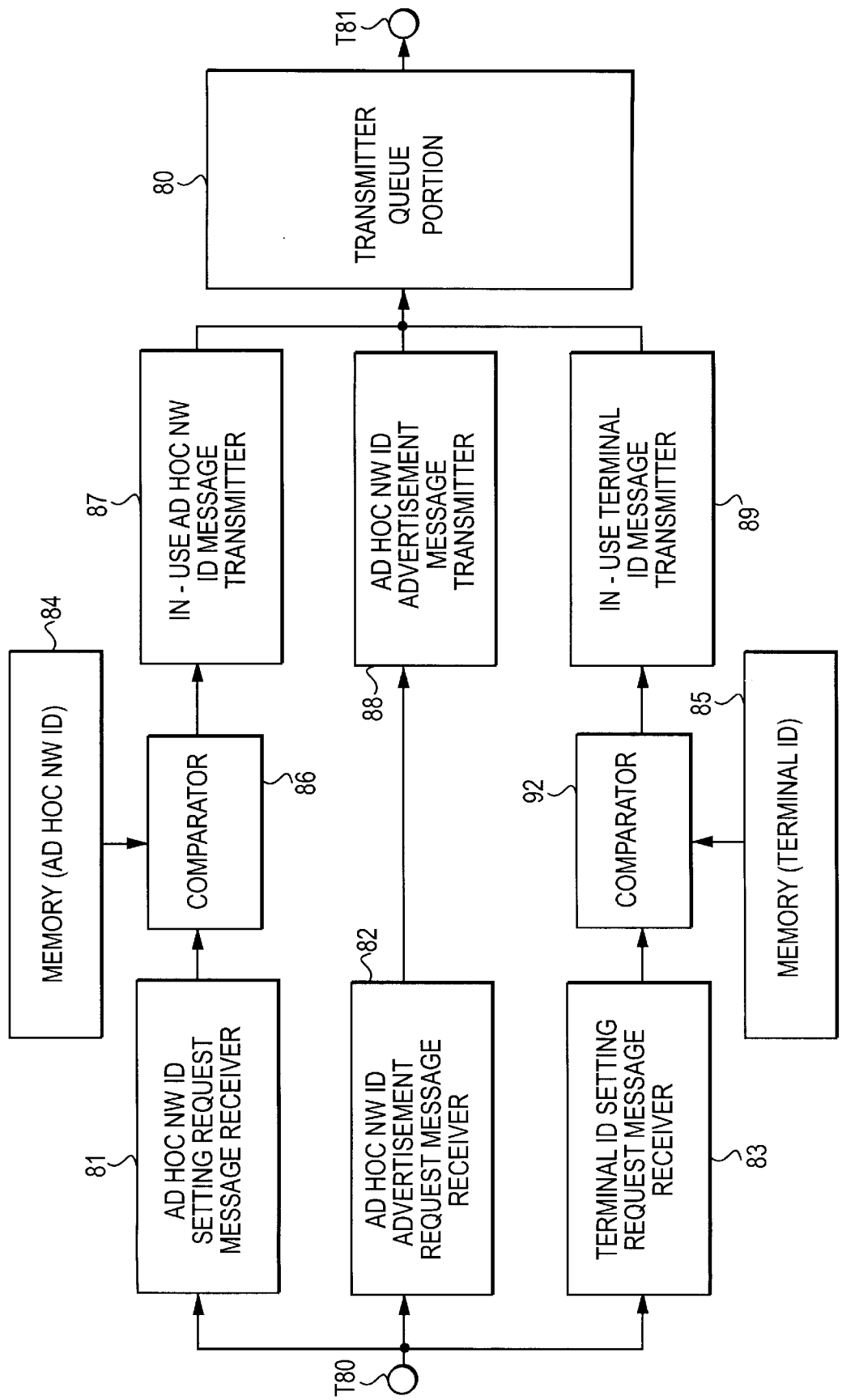
FIG. 12 is a block diagram of a construction for performing the control process at the ad hoc network connection.

FIG. 12 is a block diagram of a construction for performing the control process at the connection to the ad hoc network. As shown in FIG. 12, the mobile terminal includes, in addition to the construction mentioned hereinbefore, an input terminal T80, an ad hoc NW ID setting request message receiving portion 81, an ad hoc NW ID advertisement request message receiving portion 82, a mobile terminal identifier setting request message receiving portion 83, memories 84 and 85, comparators 86 and 92, an in-use ad hoc network identifier message transmitter portion 87, an ad hoc NW ID advertisement message transmitter portion 88, an in-use mobile terminal identifier message transmitter portion 89, a transmission queue portion 80 and an output terminal T81.

A broadcast message from the communication media to which the mobile terminal is connected is supplied through the input terminal T80 to the ad hoc network identifier setting request message receiving portion 81, the ad hoc NW ID advertisement request message receiving portion 82 and the mobile terminal identifier setting request message receiver portion 83.

The ad hoc NW ID setting request message receiving portion 81 extracts the ad hoc NW ID setting request message from the input broadcast message and supplies the ad hoc network identifier contained in the ad hoc NW ID setting request message to the comparator 86. The comparator circuit 86 reads the ad hoc network identifier stored in the memory 84 and compares the latter identifier with the ad hoc network identifier input from the ad hoc NW ID setting request message receiver portion 81. When these identifiers are identical, the mobile terminal activates the in-use ad hoc network identifier message transmitter portion 87. The in-use ad hoc network identifier message transmitter portion 87 produces an ad hoc network identifier message indicating that the requested ad hoc network identifier is in use.

The ad hoc NW ID advertisement request message receiving portion 82 extracts the ad hoc NW ID advertisement request message from the input broadcast message and activates the ad hoc NW ID advertisement message transmitter portion 88 to perform a broadcast transmission of the ad hoc NW ID advertisement request message containing the identifier of the ad hoc network to which the mobile station is connected.

The mobile terminal identifier setting request message receiver portion 83 extracts the mobile terminal identifier setting request message from the input broadcast message and supplies the requested mobile terminal identifier to the comparator circuit 92. The comparator circuit 92 compares the mobile terminal identifier stored in the memory 85 with the mobile terminal identifier from the terminal identifier setting request message receiver portion. When these identifiers are identical, the mobile terminal activates the in-use terminal identifier message transmitter portion 89 which produces an in-use terminal identifier message indicating that the requested terminal identifier is in use.

The messages output from the in-use ad hoc network identifier message transmitter portion 87, the ad hoc NW ID advertisement message transmitter portion 88 and the in-use terminal identifier message transmitter portion 89 are broadcast transmitted through the transmission queue portion 80 and the output terminal T81 to the communication media to which the mobile terminal is connected.

As described hereinbefore, according to the present invention, the mobile terminal automatically determines the kind of network to which the mobile terminal is connected, a trunk network or an ad hoc network, and performs the setting necessary for connection thereof to either one of the networks by selecting one of different control procedures. As a result, when the mobile terminal moves between, particularly, a network having a junction node through which the mobile terminal is connected to the network and a network constructed with only a plurality of mobile terminals, the mobile terminal can be connected to either one of the networks by automatically identifying the respective networks, so that the mobile terminal can communicate with others in the network to which the terminal is connected, resulting in an improved utility thereof.

What is claimed is:

1. A mobile terminal capable of being connected to either a trunk network provided with network connection nodes for connection of mobile terminals to said trunk network or an ad hoc network constructed by mutual connection of a plurality of mobile terminals, comprising:

a network detection circuit for detecting whether or not there is a network on a communication media to which said mobile station can be connected when said mobile terminal is connected to said communication media;

a trunk network connection circuit for controlling connection between said mobile terminal and said trunk network when said network detection circuit detects an existence of said trunk network;

an ad hoc network connection circuit for controlling connection between said mobile terminal and said ad hoc network when said network detection circuit detects an existence of said ad hoc network, wherein said ad hoc network connection circuit comprises:

a mobile terminal identifier candidate setting circuit for setting a candidate mobile terminal identifier for said mobile terminal predicted as being usable in a detected or newly formed ad hoc network;

a mobile terminal identifier setting request message forming circuit for forming a mobile terminal identifier setting request message containing information related to the mobile terminal identifier set as the candidate;

a broadcast message transmission circuit for performing a broadcast transmission of the formed mobile terminal identifier setting request message to the ad hoc network;

an identifier setting circuit for setting the candidate mobile terminal identifier as the identifier of said mobile terminal when said mobile terminal receives no in-use mobile terminal identifier message indicating that the candidate mobile terminal identifier indicated in the mobile terminal identifier setting request is in use within a predetermined time from the transmission of the mobile terminal identifier setting request message; and a control circuit for activating said mobile terminal identifier candidate setting circuit and selecting another candidate, when said mobile terminal receives an in-use mobile terminal identifier message indicating that the candidate mobile terminal identifier indicated in the mobile terminal identifier setting request message is in use within the predetermined time from the transmission of the mobile terminal identifier setting request message; and an ad hoc network identifier setting circuit for setting a new ad hoc network identifier for forming an new ad hoc network when said network detection circuit detects no network on said communication media to which said mobile terminal can be connected.

2. A mobile terminal as claimed in claim 1, further comprising a comparator for comparing a mobile terminal identifier contained in a mobile terminal identifier setting request message from another mobile terminal with the mobile terminal identifier of said mobile terminal when said mobile terminal receives the mobile terminal identifier setting request message from said other mobile terminal and, when the mobile terminal identifiers are identical, sending an in-use mobile terminal identifier message back to said other mobile terminal.

3. A mobile terminal capable of being connected to either a trunk network provided with network connection nodes for connection of mobile terminals to said trunk network or an ad hoc network constructed by mutual connection of a plurality of mobile terminals, comprising:

a network detection circuit for detecting whether or not there is a network on a communication media to which said mobile station can be connected when said mobile terminal is connected to said communication media;

a trunk network connection circuit for controlling connection between said mobile terminal and said trunk network when said network detection circuit detects an existence of said trunk network;

an ad hoc network connection circuit for controlling connection between said mobile terminal and said ad hoc network when said network detection circuit detects an existence of said ad hoc network, wherein said ad hoc network identifier setting circuit comprises:

an ad hoc network identifier candidate setting circuit for setting a candidate ad hoc network identifier for identifying an ad hoc network to be newly formed;

an ad hoc network identifier setting request message forming circuit for forming an ad hoc network identifier setting request message containing information related to the ad hoc network identifier set as the candidate;

a broadcast message transmitting circuit for performing a broadcast transmission of the formed ad hoc network identifier setting request message to a communication media;

an identifier setting circuit for setting the ad hoc network identifier candidate as the identifier of the new ad hoc network when said mobile terminal receives no in-use ad hoc network identifier message indicating that the candidate ad hoc network identifier indicated by the ad hoc network identifier setting request message is in use within a predetermined time from the transmission of the ad hoc network identifier setting request message; and a control circuit for activating said ad hoc network identifier candidate setting circuit and selecting another candidate when said mobile terminal receives the in-use ad hoc network identifier message indicating that the candidate ad hoc network identifier indicated in the ad hoc network identifier setting request message is in use within the predetermined time from the transmission of the ad hoc identifier setting request message; and an ad hoc network identifier setting circuit for setting a new ad hoc network identifier for forming an new ad hoc network when said network detection circuit detects no network on said communication media to which said mobile terminal can be connected.

4. A mobile terminal as claimed in claim 3, further comprising comparator for comparing an ad hoc network identifier contained in an ad hoc network identifier setting request message from another mobile terminal with the identifier of the ad hoc network to which said mobile terminal is connected when said mobile terminal receives the ad hoc network identifier setting request message from said another mobile terminal, and, when these identifiers are identical, performing a broadcast transmission of the in-use ad hoc identifier message.

* * * * *